United States Patent [19]

Nakata et al.

[11] Patent Number: 5,375,050
[45] Date of Patent: Dec. 20, 1994

[54] ELECTRIC POWER CONVERTER ARRANGEMENT AND ELECTRIC ROLLING STOCK CONTROL DEVICE USING THE SAME

[75] Inventors: Kiyoshi Nakata, Iwase; Tokunosuke Tanamachi; Kiyoshi Nakamura, both of Katsuta; Mutsuhiro Terunuma, Mito; Masato Suzuki, Urizura; Yoshio Tsutsui; Eiichi Toyota, both of Katsuta, all of Japan

[73] Assignee: Hitachi, Ltd., Tokyo, Japan

[21] Appl. No.: 978,371

[22] Filed: Nov. 18, 1992

[30] Foreign Application Priority Data

Nov. 18, 1991 [JP] Japan ................... 3-301512

[51] Int. Cl.⁵ ........................... H02M 7/505
[52] U.S. Cl. ........................ 363/41; 363/58; 363/96; 363/136
[58] Field of Search ............... 363/41, 43, 95, 96, 363/98, 135–138, 56–58; 318/800–802, 811

[56] References Cited

U.S. PATENT DOCUMENTS

| 4,386,396 | 5/1983 | Ängquist | 363/136 |
| 4,953,069 | 8/1990 | Braun et al. | 363/41 |
| 5,060,129 | 10/1991 | Maruyama | 363/41 |
| 5,155,675 | 10/1992 | Maruyama et al. | 363/98 |
| 5,321,599 | 6/1994 | Tanamachi et al. | 363/41 |

OTHER PUBLICATIONS

*PESC' 88 Record, 19th Annual IEEE Power Electronics Specialists Conference,* "A Novel Approach to the Generation and Optimization of Three-Level PWM Wave Forms", B. Velaerts, et al., Apr. 11–14, 1988, Doshisha University, Kyoto, Japan, vol. 2 of Two Volumes.

*Primary Examiner*—Steven L. Stephan
*Assistant Examiner*—Adolf Berhane
*Attorney, Agent, or Firm*—Antonelli, Terry, Stout & Kraus

[57] ABSTRACT

An electrical power converter having a phase converter constituted by positive side semiconductor switching elements connected in series and negative side semiconductor switching elements connected in series which converts a DC voltage to an AC output phase voltage having at least three potential levels, resulting in three possible modulation modes: dipolar, partial dipolar and unipolar. Dipolar modulation is realized by alternating positive and negative output pulses. Unipolar modulation is realized by output pulses having only the same polarity as the corresponding fundamental modulation wave. Transition is accomplished via partial dipolar modulation which is realized by alternating positive and negative output pulses in a first period of a half cycle by outputting alternating positive and negative pulses and in a second period by outputting pulses having only the same polarity as the corresponding fundamental modulation wave. A control unit for the converter turns the semiconductor switching elements on and off depending on an input voltage amplitude command for a fundamental modulation wave. The intervals of the first and second periods in the half cycle of the AC output phase voltage varies dependent upon the voltage amplitude command.

10 Claims, 13 Drawing Sheets (a) FUNDAMENTAL MODULATION WAVE (b) POSITIVE AND NEGATIVE BIASED MODULATION WAVES (c) POSITIVE SIDE MODULATION WAVE (d) NEGATIVE SIDE MODULATION WAVE (e) POSITIVE SIDE PULSE PATTERN $S_p$ (f) NEGATIVE SIDE PULSE PATTERN $S_n$ (g) OUTPUT VOLTAGE (a) FUNDAMENTAL MODULATION WAVE (b) POSITIVE AND NEGATIVE BIASED MODULATION WAVES (c) POSITIVE SIDE MODULATION WAVE (d) NEGATIVE SIDE MODULATION WAVE (e) POSITIVE SIDE PULSE PATTERN (f) NEGATIVE SIDE PULSE PATTERN (g) OUTPUT VOLTAGE (a) FUNDAMENTAL MODULATION WAVE (b) POSITIVE AND NEGATIVE BIASED MODULATION WAVES (c) POSITIVE SIDE MODULATION WAVE (d) NEGATIVE SIDE MODULATION WAVE (e) POSITIVE SIDE PULSE PATTERN (f) NEGATIVE SIDE PULSE PATTERN (g) OUTPUT VOLTAGE (a) POSITIVE AND NEGATIVE BIASED MODULATION WAVES (b) POSITIVE SIDE PULSE PATTERN $S_p$ (c) NEGATIVE SIDE PULSE PATTERN $S_n$ (d) OUTPUT VOLTAGE

ELECTRIC POWER CONVERTER ARRANGEMENT AND ELECTRIC ROLLING STOCK CONTROL DEVICE USING THE SAME

BACKGROUND OF THE INVENTION

1. Field of the Invention

The present invention relates to an improvement of an electrical power converter arrangement which converts a DC into an AC or vice versa, and, in particular, relates to an output voltage control of such an electric power converter arrangement.

2. Description of Related Art

B. Velaerts et al. "A Novel Approach to the Generation and Optimization of Three-Level PWM Wave Forms" (PESC '88 RECORD, TEEE, April 1988, pp 1255-1262) proposes a use of a dipolar modulation mode which is adapted to alternatively output positive and negative pulse like voltages via zero potential for improving output voltage wave forms of a three-level inverter.

The above paper indicates that the transition from a dipolar modulation mode to a unipolar modulation mode, which is adapted to output only pulse like voltages having the same polarity as the output voltage, has to be performed at optimum six points existing in one cycle.

Further, FIG. 9 in JP-A-2-101969 (1990), which corresponds U.S. Pat. No. 4,953,069, discloses existence of both the dipolar modulation period and the unipolar modulation period in a half cycle of the output voltage.

The use of the dipolar modulation mode is desirable for an improvement of the output voltage wave forms as well as for a fine voltage regulation.

However, when a certain output voltage is required to be realized, the dipolar modulation mode necessitates having pulses in opposite polarity to the output voltage, thereby the voltage utilization rate decreases. Accordingly, the transition from the dipolar modulation mode to the unipolar modulation mode is inevitable.

When the dipolar modulation mode is shifted to the unipolar modulation mode, and when the load thereof is an AC motor, motor torque fluctuation is caused from increased current ripples during the change-over.

The former prior art indicates that the transition between the dipolar modulation mode and the unipolar modulation mode is controlled to be carried out at a predetermined phase.

However, such control must be carried out after determining the optimum points which exist only six times in one cycle. Therefore the control system, in relation with the timing, increases in control complexity.

Further, for example, when an output voltage of an electric power converter is required in response to a certain output voltage command by making use of the unipolar modulation mode, the feet portions of the sinusoidal output voltage command can not be realized correctly. This is because there exists a minimum on time in the switching elements constituting the electric power converter, and such a small output voltage command as in the feet portions can not be realized as the output voltage of the electric power converter.

Now, FIG. 9 of the latter prior art illustrates a waveform which includes a fixed period (60°) in dipolar modulation mode and the remaining period in unipolar modulation mode in one cycle. However, such waveform is outputted in order that a portion where the modulation wave exceeds over 1 is compensated with the other phases.

Accordingly, in the above prior art, very small output voltage feet portions portions, can not be realized.

SUMMARY OF THE INVENTION

An object of the present invention is to provide an electric power converter arrangement and an electric rolling stock control device using the same, which uninterruptedly controls the converter output voltage.

Further, another object of the present invention is to provide an electric power converter arrangement and an electric rolling stock control device using the same, which accurately reproduces an output voltage command in the converter output voltage.

The above objects are achieved by an electric power converter arrangement which includes a first modulation region realizing a half cycle of the output voltage by alternatively outputting positive and negative output pulses and a second modulation region realizing a half cycle of the output voltage by only outputting output pulses having the same polarity as the output voltage. This converts a DC voltage into an AC phase voltage having at least three level potentials, wherein when shifting from the first modulation region to the second modulation region, the transition is performed via a third modulation region.

Further, the above objects are achieved by an electric power converter arrangement for converting a PC voltage into an AC phase voltage having at least three level potentials. The potentials include a third modulation region constituted by in a half cycle of the output voltage, a period alternatively outputting positive and negative output pulses and another period outputting only output pulses having the same polarity as the output voltage. The converter further comprises means for varying both these periods.

In the course of transition between the first modulation region (dipolar modulation region), and the second modulation region (unipolar modulation region), the transition is not performed directly but performed via the third modulation region. Therefore the increase of the current ripples caused during direct transition is suppressed.

Further, when noting output voltage commands in a half cycle, the sinusoidal waves near the crest high output voltages have to be outputted and the feet portions thereof very small output voltages have to be outputted.

In a period of comparatively high output voltages, such as near at the crest thereof are required, the unipolar modulation mode is used. In a period of comparatively low output voltages, such as near at the feet thereof are required, the dipolar modulation mode is used. Further, these periods are adapted to be varied, thereby, even if the output voltage command varies an output voltage which correctly corresponds to the reproduced varied voltage command.

BRIEF EXPLANATION OF THE DRAWINGS

FIG. 2 (b) is a diagram illustrating a relationship between inverter frequency and output voltage;

DESCRIPTION OF PREFERRED EMBODIMENTS

Hereinbelow, after explaining an outline of the present invention, embodiments of the present invention are explained with reference to FIG. 1 through FIG. 14.

These days, such a technology is going to be established that an induction motor, in particular, an induction motor for driving rolling stocks, is operated by an inverter called a three-level inverter. This may also be called a multi-series inverter, in which a high potential point of a DC power source, a low potential point and an intermediate potential point between the high potential point and low potential point is provided. Potentials of three levels of the high potential point, the low potential point and the intermediate potential point are selectively led out at AC terminals as the phase voltage. This is done via selective on and off operation of the groups of the switching elements constituting the inverter.

One of major features of the three-level inverter is that an AC output including small relative harmonic contents is obtained due to apparent increases in the PWM switching frequency.

Thereby, the torque fluctuation of the motor connected thereto is reduced and a lowering of breakdown voltage of the switching elements is also achieved.

Figure 1:
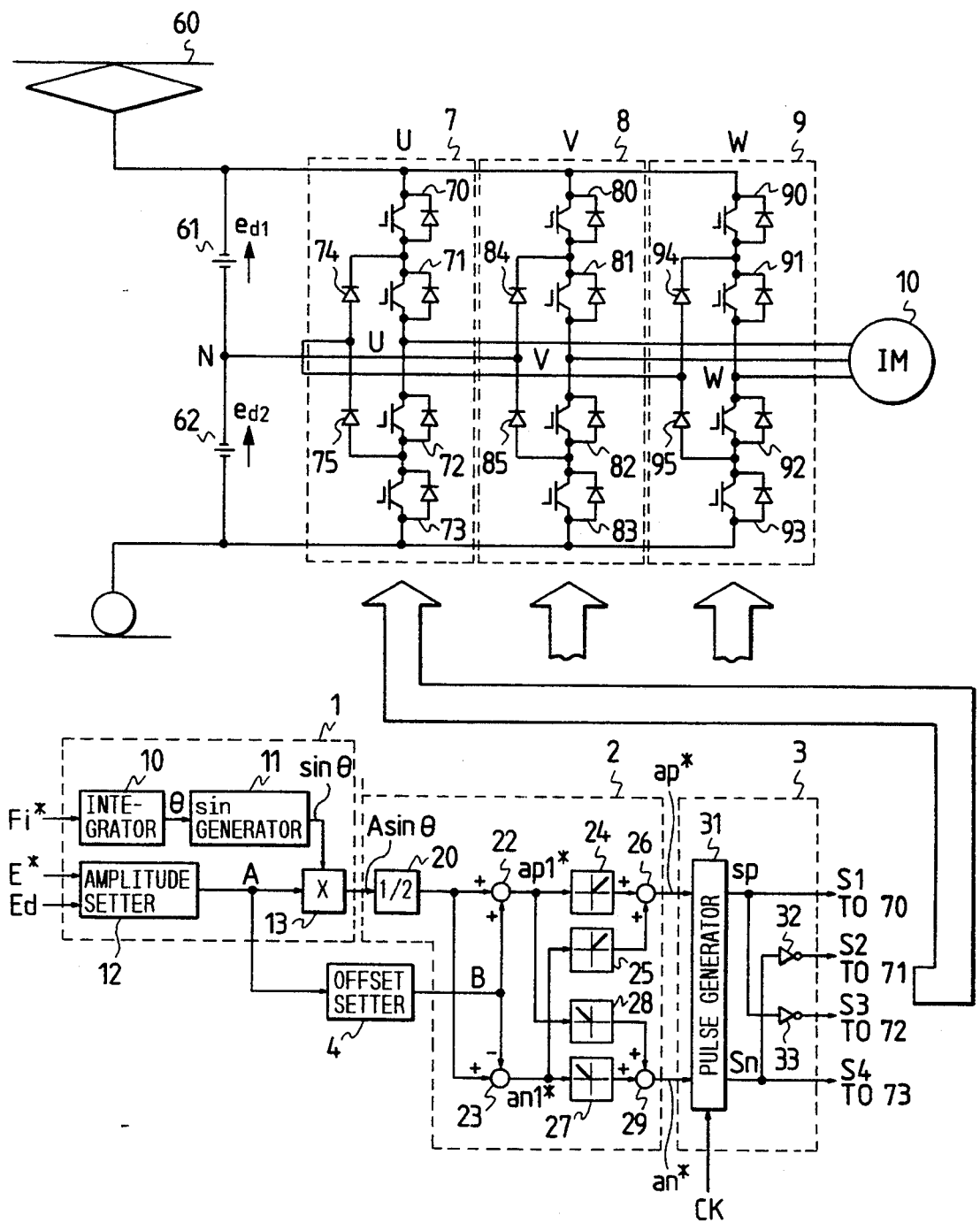
FIG. 1 is a circuit diagram Illustrating one embodiment according to the present invention.

The fundamental structure of the main circuit, in case of three phases, of an electric power inverter arrangement is illustrated in FIG. 1.

In FIG. 1, numeral 60 is an electric overhead line of a DC voltage source, numerals 61 and 62 are dividing voltage capacitors for establishing an intermediate point N, hereinbelow called as a neutral point, from the DC voltage source 60, numerals 70~73, 80~83 and 90~93 are self extinguishable switching elements each having a rectifying element for current circulation. In the present embodiment IGBTs are exemplified, however, GTOs and transistors can be used in place of the IGBTs. Numerals 74, 75, 84, 85, 94 and 95 are auxiliary rectifying elements for leading out the neutral point potential from the capacitors. Further, in the present embodiment, a load in the form of an induction motor 10 is exemplified.

The fundamental operation of switching arms 7~9, which are independently operable by every phase, is explained by taking up the switching arm 7 as an example.

Voltages ed1 and ed2 at the capacitors 61 and 62 are assumed as ideal smooth DC voltage sources and defined as:

$ed1 = ed2 = Ed/2$ (wherein, $Ed$: total DC voltage)

Under the above condition, when the switching elements 70~73 are on and off controlled according to the sequence illustrated in Table 1, a three level output voltage e of $Ed/2$, 0 and $-Ed/2$ is obtained at an AC output terminal U.

TABLE 1

| Conductive condition of switching elements | | | | Switching function | | | | Output voltage |
|---|---|---|---|---|---|---|---|---|
| 70 | 71 | 72 | 73 | Sp | So | Sn | S | e |
| on | on | off | off | 1 | 0 | 0 | 1 | Ed/2 |
| off | on | on | off | 0 | 1 | 0 | 0 | 0 |
| off | off | on | on | 0 | 0 | 1 | −1 | −Ed/2 |

Sp~Sn and S are switching functions which express the conductive condition of the switching elements 70~73 in a form of 1, 0 and −1, and the output voltage e is expressed as follows;

$$e = Sp\ ed1 - Sn\ ed2 = S\ Ed/2 \quad (1)$$

The waveform of the output voltage e is determined by the combination of pulse like voltages having magnitudes of $Ed/2$, 0 and $-Ed/2$ and the switching function $S = Sp - Sn$ is, in general, PWM-controlled in such a manner that the waveform of the output voltage approximates to a sinusoidal waveform.

In a PWM control device, the conductive condition of the switching elements is determined by establishing the switching functions Sp and Sn.

Further, details of the three-level inverter are disclosed such as in JP-B-51-47848 (1976) and JP-A-56-74088 (1981).

Now, referring to the case of an electric rolling stock control device in which a speed control over a broad range is performed with a limited source voltage. When performing a speed control over from a variable voltage variable frequency (VVVF) region to a constant voltage variable frequency (CVVF) region, an output voltage characteristic illustrated by a solid line in FIG. 2 (b) is required.

Namely, in a low speed region, the output voltage is adjusted in substantial proportion to the inverter frequency. This region is called a VVVF control region, wherein the magnetic flux within the motor is maintained substantially constant and a predetermined torque is obtained. In a high speed region, the inverter frequency is successively increased while maintaining the inverter output voltage at the maximum which is called as CVVF region. In the CVVF region, the voltage utilization rate is maximized and a high speed operation is realized with the Limited source voltage.

However, for a very small voltage command, there are, two important instances, one wherein the inverter output frequency is small and the output voltage command itself is also small, and the other wherein the output voltage command is large in comprison with the output frequency and a very small voltage is included in the sinusoidal wave form required to be outputted. Any smaller voltage than the voltage produced by an output pulse having the minimum pulse width which is determined by the minimum on time of the switching elements can not be realized, in other words, can not be reproduced as an inverter output voltage, and thus a larger output voltage than the output voltage command is outputted.

For example, the fundamental wave component E1 of the output voltage, which is obtained when all of the voltage pulses for the inverter output voltage are those having the minimum pulse width determined by the minimum on time, is expressed by the following formula;

$$E1 = 2Ton\, PFi\, Emax \tag{2}$$

Wherein, Ton is minimum on time, P is number of pulses, Fi is inverter frequency, and Emax is maximum output voltage.

Now, switching frequency Fc is expressed as follows;

$$Fc = PFi \tag{3}$$

thus the fundamental wave component E1 of the output voltage is expressed by the following formula.

$$E1 = 2Ton\, Fc\, Emax \tag{4}$$

Accordingly, for example, when assuming that the switching frequency is 1 KHz and the maximum on time is 100 μs, E1=0.2Emax, the output voltage below 20% of the maximum output voltage can not be controlled.

Figure 2A:
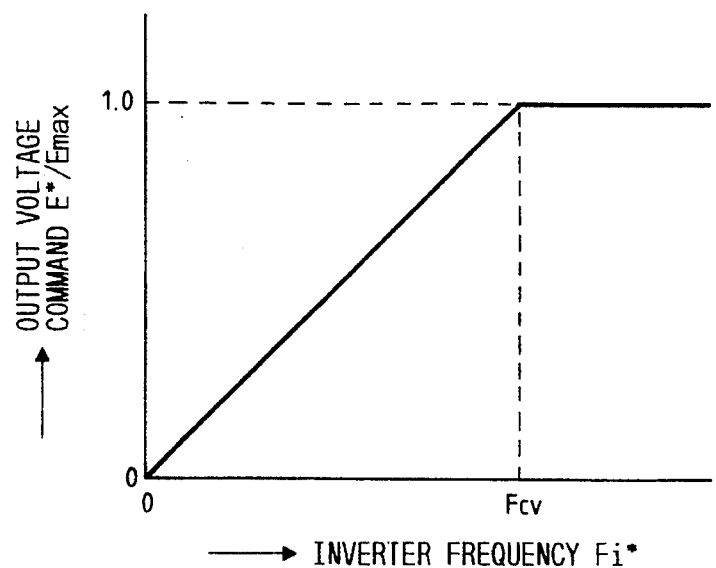
FIG. 2 (a) is a diagram illustrating a relationship between inverter frequency and output voltage command.
Figure 2B:
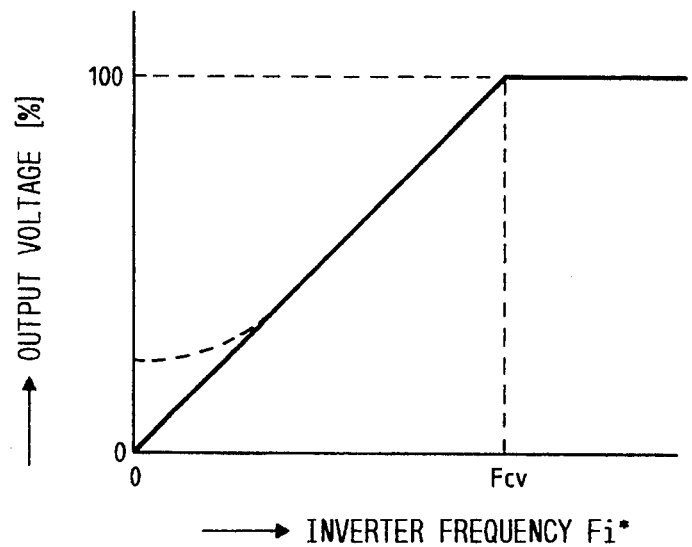

For this reason, the controlable minimum output voltage is limited dependent upon the characteristic illustrated by the dotted line shown in FIG. 2 (b), such that there was a problem that a continuous output voltage regulation was difficult.

Accordingly, in the present embodiment when outputting a very small output voltage in accordance with a small inverter output voltage command, the small output voltage command is reproduced in the inverter output voltage by alternatively outputting high and low potential pulses like voltages via an intermediate potential of three levels, in that dipolar modulation.

When a very small voltage is contained in a sinusoidal wave required to be outputted although the amplitude of the output voltage command is not so small, an inverter output voltage exactly corresponding to the output voltage command is realized by providing in a half cycle of the output voltage a period wherein high and low potential pulse like voltages are alternatively outputted via an intermediate potential among the three levels and another period wherein only output pulses having the same polarity as the output voltage are outputted, in that a combined modulation of the dipolar modulation and the unipolar modulation, which is hereinbelow called as a partial dipolar modulation.

In accordance with increase of the output voltage command, all of the pulses are changed to those having the same polarity as the output voltage, in that unipolar modulation.

In order to further increase the output voltage, the output of the intermediate potential is suppressed by maximizing the output pulse width near the peak of the instantaneous output voltage and the output voltage is increased until the number of pulses contained in a half cycle of the output voltage becomes one.

Through continuous transition of these series of modulation modes, a highly accurate and stable output voltage from zero voltage to the maximum voltage is continuously obtained.

Hereinbelow, a relationship between the inverter output voltage command and the inverter output voltage is explained with reference to FIG. 2 (a) through FIG. 8.

An inverter output voltage command E* is set in response to an inverter frequency Fi* as illustrated in FIG. 2 (a), wherein Fcv is an inverter frequency from which the output voltage command is kept constant.

With the inverter output voltage command E* and the DC voltage Ed, an amplitude A of a fundamental modulation wave is set according to the following formula.

$$A = 2\sqrt{2}\, E^*/Ed \tag{5}$$

Figure 3:
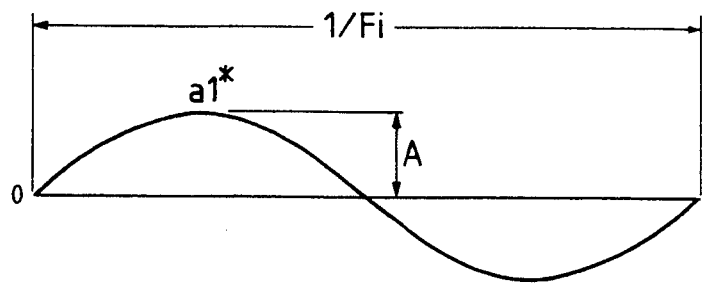
FIGS. 3a-g are diagrams illustrating a fundamental modulation wave and output voltage pulse waveforms during dipolar modulation operation.
Figure 3:
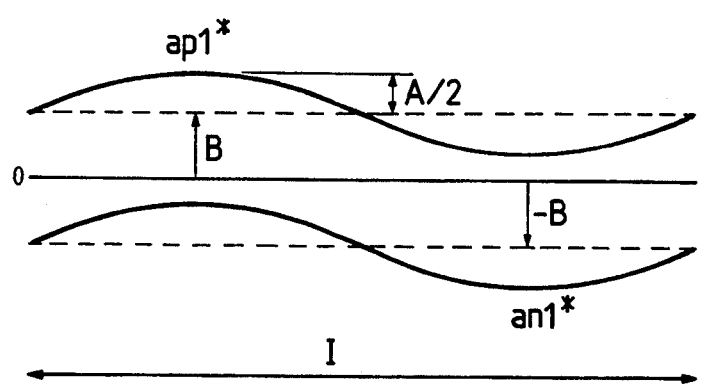
Figure 3:
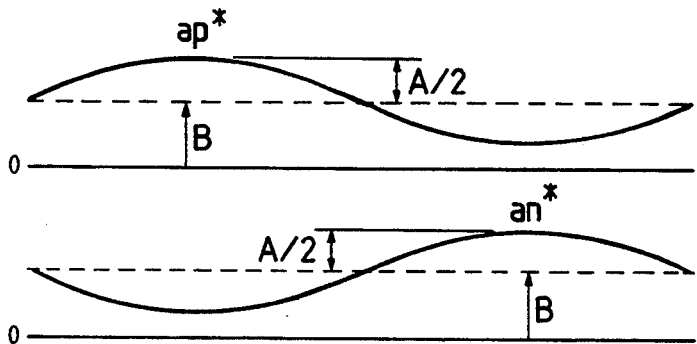
Figure 3:
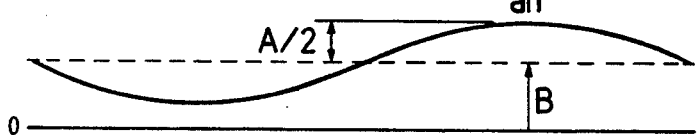
Figure 3:
Figure 3:
Figure 3:
Figure 4:
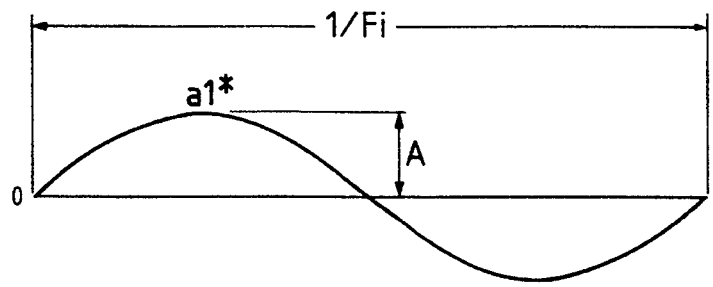
FIGS. 4a-g are diagrams illustrating a fundamental modulation wave and output voltage pulse waveforms during partial dipolar modulation operation.
Figure 4:
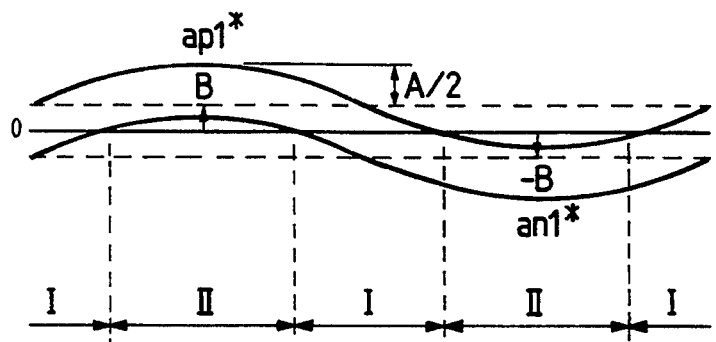
Figure 4:
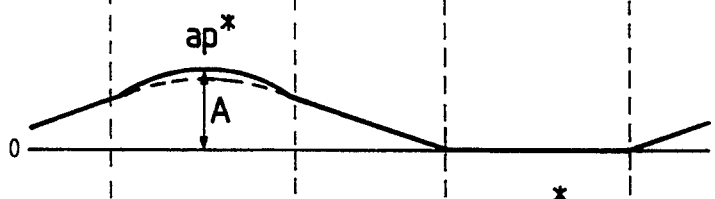
Figure 4:
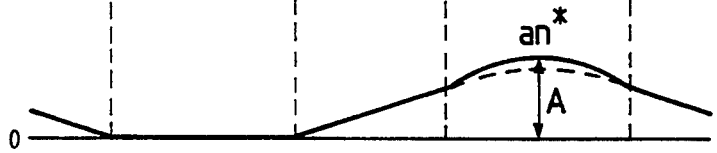
Figure 4:
Figure 4:
Figure 4:
Figure 5:
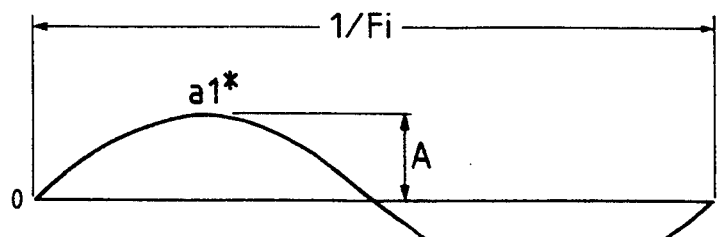
FIGS. 5a-g are diagrams illustrating a fundamental modulation wave and output voltage pulse waveforms during unipolar modulation operation.
Figure 5:
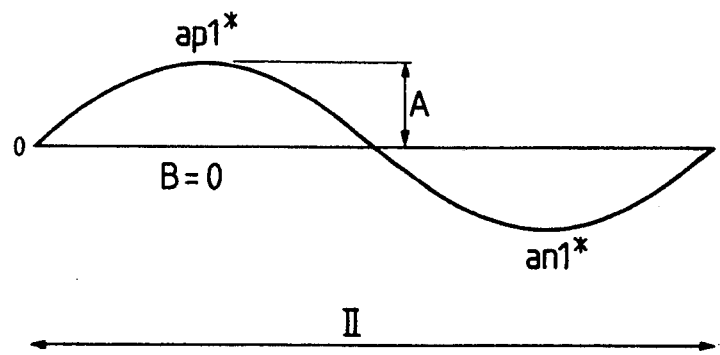
Figure 5:
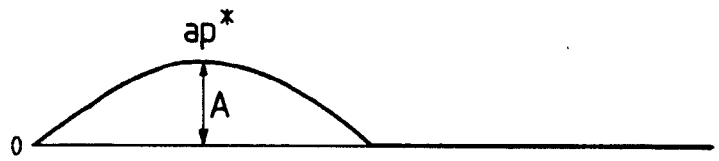
Figure 5:
Figure 5:
Figure 5:
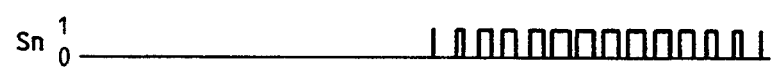
Figure 5:

A fundamental modulation wave a1* is determined by the amplitude command A and the phase $\theta$ thereof as follows;

$$a1^* = A \sin \theta \tag{6}$$

which is illustrated in FIG. 3 (a), FIG. 4 (a) and FIG. 5 (a).

Hereinbelow, the dipolar modulation is explained with reference to FIG. 3.

In order to obtain the minimum on pulse width, in other words pulse width for the minimum on time, when the inverter output voltage command E* is very small, two positive and negative biased modulation waves ap1* and an1* according to the following formulas are prepared as illustrated in FIG. 3 (b).

$$\left. \begin{array}{l} ap1^* = (A/2) \sin \theta + B \\ an1^* = (A/2) \sin \theta - B \end{array} \right\} \tag{7}$$

Wherein, B is amount of offset, the output from an offset setting unit 4.

Now, by setting the amount of offset exceeding a predetermined value as illustrated in FIG. 3 (c) and (d), generation of a very small output voltage command is prevented, in that commands near zero are eliminated both for the upper and lower arms and the minimum on time for the respective switching elements is maintained, thereby the output voltage is controlled even at a very small amount while maintaining the predetermined minimum on pulse width.

The amount of offset B is herein implied as a DC voltage which is superposed on the output voltage command toward a predetermined direction, in that a bias voltage.

The positive side pulse pattern, the switching function Sp as illustrated in FIG. 3 (e) and the negative side pulse pattern, the switching function Sn as illustrated in FIG. 3 (f) are produced based upon the positive and negative side modulation waves ap* and an* at a pulse generation period 2Tck. The pulse width during the pulse generation period 2Tck is determined dependent upon the amplitudes of the respective modulation waves and when ap*, an*≧0, the pulse generation is continued and when ap*, an*=0, the pulse generation is suppressed. FIG. 3 (g) is an output pulse voltage appearing at the AC terminal U in the inverter arm 7 when the positive and negative side pulse patterns as shown in FIG. 3 (e) and FIG. 3 (f) and pulse patterns $\overline{Sp}$ and $\overline{Sn}$ are respectively applied to the corresponding gates of the switching elements.

Now, the partial dipolar modulation is explained with reference to FIG. 4.

It is preferable to use the partial dipolar modulation in a region wherein the amplitude of the output voltage command is not so high, without neglecting the feet portions of the sinusoidal wave. Namely, if the entire period is covered by the dipolar modulation, no problems arise with respect to reproduction of the output voltage command, however the voltage utilization rate reduces. On the other hand, if the entire output voltage command is reproduced by the unipolar modulation in order to improve the voltage utilization rate, the feet portions can not be correctly reproduced by the limitation due to the minimum on time.

In such region, the feet portions are reproduced by making use of the dipolar modulation and the period thereof is varied depending upon the amplitude of the output voltage command.

As seen from FIG. 4 (b), there appear regions such as ap1*<0, or an1*>0 depending upon offset amount B in which generation of pulse patterns for realizing the positive and negative biased modulation waves ap1* and an1* in the inverter output is impossible.

For example, in a region of an1*>0, it becomes necessary to produce a positive output voltage with a negative side pulse pattern.

In view of the main circuit structure of the three-level inverter, an output pulse voltage of a positive polarity can not De outputted by adjusting only the negative side pulse pattern, therefore a positive output voltage can not be prepared by the negative side pulse pattern. Similarly, in case of a positive side pulse pattern, a negative output voltage can not be produced by the positive side pulse pattern.

According to the present embodiment wherein the PWM modes are changed by varying the offset amount, the above condition occurs in particular when shifting from the dipolar modulation mode to the unipolar modulation mode.

Thereby, in such regions the pulse pattern is determined to compensate the under voltage of a modulation wave of one polarity by another modulation wave of the opposite polarity.

Namely, as illustrated in FIG. 4 (c) and (d), by setting the positive and negative side modulation waves ap* and an* as in the following formulas, the under voltage can be compensated by the output voltage of the modulation wave of the opposite polarity, as a result, an output voltage corresponding correctly to an inverter output voltage command is reproduced.

$$ap^* = \begin{cases} (A/2)\sin\theta + B & (ap1^* > 0 \text{ and } an1^* < 0) \\ A\sin\theta & (ap1^* > 0 \text{ and } an1^* > 0) \\ 0 & (ap1^* \leq 0) \end{cases} \quad (8)$$

$$an^* = \begin{cases} (A/2)\sin\theta - B & (ap1^* > 0 \text{ and } an1^* < 0) \\ A\sin\theta & (ap1^* < 0 \text{ and } an1^* < 0) \\ 0 & (ap1^* \geq 0) \end{cases} \quad (9)$$

Wherein, in period I, in that ap1*>0 and an1*<0, the dipolar modulation is carried out and in period II, in that ap1*>0 and an1*>0 or ap1*<0 and an1*<0, the unipolar modulation is carried out.

By changing the interval of the period I and period II in response to the inverter output voltage command or by varrying the ratio of the period I and the period II in a half cycle of the inverter output voltage an output voltage corresponding correctly to an inverter output voltage command is reproduced in the partial dipolar modulation region.

Now, when the offset amount B is further reduced to B=0, the PWM mode is shifted to the unipolar modulation mode.

The unipolar modulation mode is explained with reference to FIG. 5.

When the offset amount B is reduced to 0, the two biased modulation waves ap1* and an1* as shown in FIG. 5 (b) completely coincide, and as illustrated in FIG. 5 (c) and (d) the positive and negative side modulation waves ap* and an* are modified as in the following formulas.

$$ap^* = \begin{cases} A\sin\theta & (ap1^* \geq 0) \\ 0 & (ap1^* < 0) \end{cases} \quad (10)$$

$$an^* = \begin{cases} 0 & (an1^* > 0) \\ A\sin\theta & (an1^* \leq 0) \end{cases} \quad (11)$$

Figure 7:
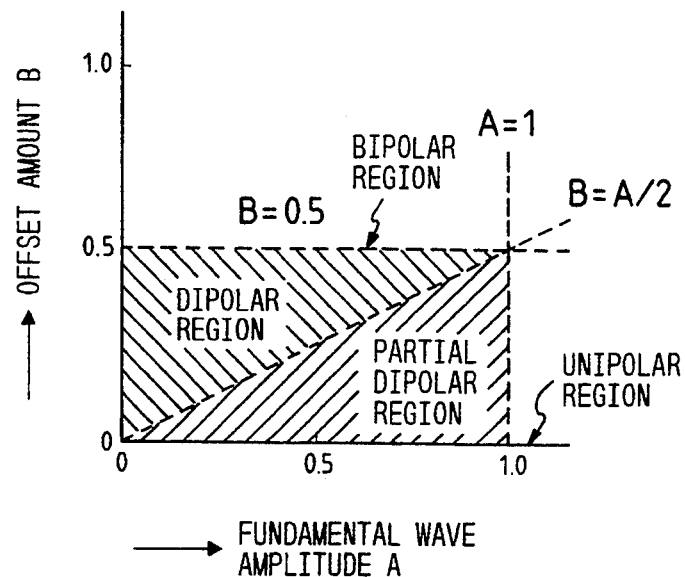
FIG. 7 is a diagram illustrating a relationship between amplitude A of fundamental modulation wave and offset amount B for determining PWM modes.

In the present embodiment, setting of the offset amount B is important and the range of the offset amount B to be set is limited to the three regions as shown in FIG. 7.

Dipolar modulation region: A/2≦B<0.5
Partial dipolar modulation region: 0<B<A/2
Unipolar modulation region: B=0

In the dipolar modulation region, the dipolar modulation control is performed over the entire period (see FIG. 3 (e), (f) and (g)).

In the partial dipolar modulation region, the unipolar modulation mode is used near at the peak of the output voltage and the dipolar modulation mode is used at the feet portions of the inverter output voltage command (see FIG. 4 (e), (f) and (g)).

Further when B=0, the entire period is operated by the unipolar modulation mode (see FIG. 5 (e), (f) and (g)).

Still further, when B=0.5, the PWM mode is rendered to a two level bipolar modulation mode with no intermediate potential.

Accordingly, in a region of requiring a small fundamental modulation wave amplitude A the offset amount B is set in a range of $A/2+\Delta 1 \leq B \leq 0.5 - \Delta 2$, wherein $\Delta 1$ and $\Delta 2$ are constants determined by minimum on.off time, in order to maintain a predetermined zero voltage period, and the offset amount B is decreased in response to increase of the fundamental modulation wave amplitude A, thereby achieving a smooth and constinuous pulse mode transition.

Figure 8:
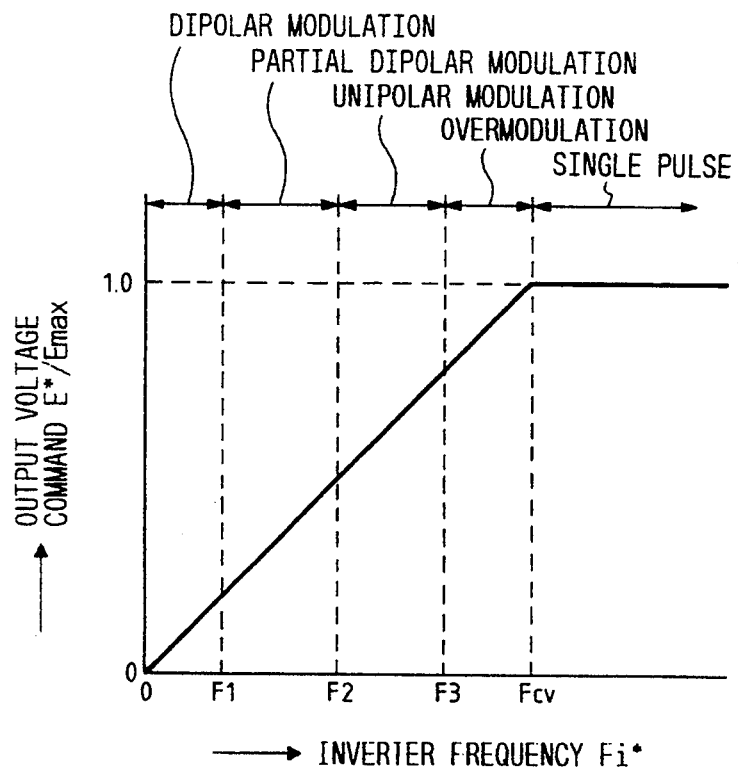
FIG. 8 is a diagram illustrating a relationship between inverter frequency, output voltage command and PWM modes.

Namely, in the output voltage characteristic as illustrated in FIG. 8, the PWM modes shift in response to inverter frequency Fi from the dipolar modulation mode ($0 \leq Fi \leq F1$) and the partial dipolar modulation mode ($F1 \leq Fi \leq F2$) to the unipolar modulation mode ($F2 \leq Fi \leq F3$), and further shifts to a three-level single pulse mode ($Fi \geq Fcv$) having indispensable intermediate potential via the overmodulation mode ($F3 \leq Fi \leq Fcv$) which will be explained below.

Now, the overmodulation region is explained with reference to FIG. 6.

The overmodulation region is a region wherein the offset amount B is zero and further a part of the inverter output voltage command exceeds one.

When the unipolar modulation is performed for the portion wherein the inverter output voltage command exceeds one, the average voltage drops because of the existence of an off period and an output voltage corresponding to an output voltage command can not be outputted.

Figure 6:
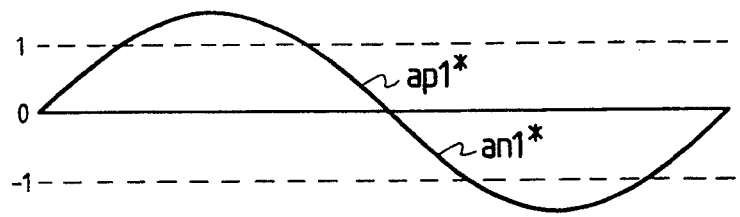
FIGS. 6a-d are diagrams illustrating a fundamental modulation wave and output voltage pulse waveforms during overmodulation operation.
Figure 6:
Figure 6:
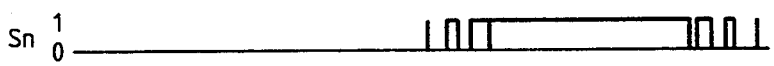
Figure 6:

Therefore, the pulses existing in the period wherein the inverter output voltage command exceeds one are connected as illustrated in FIG. 6 (b), (c) and (d).

Further, when the substantial part of the output voltage command exceeds one, the number of pulses contained in a half cycle is reduced to one, which is called three level single pulse modulation mode (not shown).

Now, turning to an application of the present embodiment to an induction motor control for rolling mills which does not make use of a broad range control including such as the overmodulation region and the single pulse modulation region. The transition between the dipolar modulation region, the partial dipolar modulation region and the unipolar modulation region is performed in response to such as the inverter frequency and the output voltage command corresponding thereto. Thereby, the torque fluctuation due to current ripple increase during the transition is suppressed and further, the harmonic components contained in the output current is reduced because even a very small output voltage command is correctly reproduced.

Further, in a dynamic motor control which makes use of a single pulse modulation region such as in an electric rolling stock control, it is not preferable to cause a torque fluctuation over the entire regions from a very low speed to a very high speed.

Therefore, if the dipolar modulation is used, at least for the VVVF region, the suppression of the torque fluctuation is achieved. However, the voltage utilization rate during the period is reduced.

Therefore, the PWM modes are successively changed-over dependent upon increase of the inverter frequency or the vehicle speed proportional thereto.

Namely, as illustrated in FIG. 8, from the start to the inverter frequency F1 the dipolar modulation mode which enables to output a very small output voltage is used. After reaching the inverter frequency F1, the PWM mode is shifted to the partial dipolar modulation region. The PWM mode is successively shifted to the unipolar modulation region at F2, to the overmodulation region at F3 and to the single pulse modulation region at Fcv.

The transition between the regions is performed by two methods, one is in response to the inverter frequency and the other is in response to the output voltage command.

Accordingly, in the electric rolling stock control device in which it is difficult to prevent the shocks during the start because a very small output voltage could not be outputted, a control with little torque fluctuation can be performed while maintaining a high voltage utilization rate during the start as well as other operating regions.

Hereinabove, the principle of the present embodiment is explained with reference to a relationship between the waveforms of the inverter output voltage command and the output pulses. Hereinbelow the constitution which realizes the above explained principle is explained.

FIG. 1 is an example of control devices for an electric inverter which outputs an AC output voltage varying between three level potentials via an on and off control of four serially connected switching element groups, in the drawing the control device for one phase is illustrated.

In FIG. 1, a fundamental wave voltage command generator 1 is inputted of a frequency command Fi* of the inverter output voltage, an effective output voltage command E* and a DC voltage Ed, determines fundamental modulation wave $A \sin \theta$ and outputs the same to an amplitude command distributor 2.

An offset setting unit 4 outputs an offset amount B, which is calculated and set dependent upon a fundamental modulation wave amplitude A to the amplitude command distributor 2.

Further, the amplitude command distributor 2, to which the fundamental modulation wave $A \sin \theta$ and the offset amount B are inputted, generates the positive and negative side modulation waves ap* and an* as illustrated in FIG. 3 (c) and (d), FIG. 4 (c) and (d) and FIG. 5 (c) and (d).

Still further, a pulse generator and distributor 3, to which the positive and negative side modulation waves ap* and an* are inputted, produces PWM pulse trains S1 through S4 which are determined by the switching functions Sp and Sn and are to be provided to the switching elements.

These PWM pulse trains S1 through S4 are provided to the switching elements 70 through 73 for U phase via a gate amplifier not shown to perform an on and off control of the respective switching elements.

Hereinbelow the above mentioned constitutions are explained in datals.

The phase $\theta$ is obtained by time-integrating in an integrator 10 of the frequency command Fi* of the inverter output voltage which is obtained by adding operation of the slip frequency obtained based upon the deviation between a motor current command and a motor actual current and a motor rotating frequency.

The value of $\sin \theta$ calculated in a sin generator 11 based upon the thus obtained $\theta$, and the fundamental modulation wave amplitude A which is obtained in an amplitude setting unit 12 based upon the effective output command E*, which is proportional to the frequency command Fi*, and the DC voltage Ed are multiplied in a multiplier 13 and an instantaneous fundamental modulation wave $A \sin \theta$ is outputted therefrom. If the power source is an accurate voltage source such input Ed is eliminated, however the overhead line is not necessarily a constant one, it is necessary to adjust the modulation rate with this input value.

Two sinusoidal shaped biased modulation waves ap1* and an1* are prepared by adding or subtracting the offset amount B set via the offset setting unit 4 dependent upon the fundamental modulation wave amplitude A to and from a signal obtained by dividing into ½ via a ½ unit 20 of the fundamental modulation wave A sin θ inputted from the fundamental wave voltage command generating means 1 via adders 22 and 23. The fundamental modulation wave is not necessarily divided into ½, but if not, the constitution following thereto complexes.

From these sinusodial shaped biased modulation waves ap1* and an1*, a positive side modulation wave ap* and a negative side modulation wave an* are respectively generated via polarity discrimination and distributors 24 and 25 and an adder 26, and via polarity discrimination and distributors 27 and 28 and an adder 29.

Based upon the positive side modulation wave ap* and the negative side modulation wave an* outputted from the amplitude command distributor 2, a pulse generator 31 produces a positive side pulse pattern corresponding to the switching function Sp and a negative side pulse pattern corresponding to the switching function Sn and generates the PWM pulse trains, in that the gate signals S1~S4.

Now, the operation of the amplitude command distributor 2 is explained by taking up the example of the partial dipolar modulation as illustrated in FIG. 4.

The output of the fundamental wave voltage command generator 1 as shown in FIG. 4 (a) is divided into ½ by the ½ unit 20 to which the above mentioned offset amount B is superposed to thereby obtain the waveforms illustrated in FIG. 4 (b).

Now, based upon these biased modulation waves ap1* and an1*, the positive side modulation wave ap* and the negative side modulation wave an* have to be prepared, however, if the phase of the negative biased modulation wave an1* is inverted as it is to obtain the negative side modulation wave an*, the fundamental modulation wave can not correctly be reproduced in period II in the negative biased modulation wave an1*.

Therefore, in the present embodiment, the above problem is resolved by providing the polarity discrimination and distributors 24, 25, 26 and 27.

Namely, the polarity discrimination and distributor 25 is provided so that the positive portion in the negative biased modulation wave an1* is obtained as a part of the positive side modulation wave ap*, and further, the polarity discrimination and distributor 28 is provided so that the negative portion in the positive biased modulation wave ap1* is obtained as a part of the negative side modulation wave an*.

With these provisions, the positive and negative side modulation waves ap* and an* are obtained from the adders 26 and 29.

Thereafter, these positive and negative side modulation waves ap* and an* are converted into PWM pulses via the pulse generation and distributor 3 which is explained hereinbelow.

Now, the operation of the pulse generation and distributor 3 is explained which generates pulse patterns for turning on and off the switching elements.

The positive and negative side pulse patterns or switching functions Sp and Sn for the output voltage are realized by the pulse generator 31.

Clock signals CK inputted to the pulse generator 31 are reference signals which determine the pulse generation timing and the switching frequency of the switching elements.

In the present embodiment, an example of pulse generators 31 is explained which is constituted by means for calculating pulse leading and trailing timings, and two timers which output pulses at the timing set in synchronism with the reference clock signals CK.

The pulse patterns for the output voltages are classified into three periods according to the amplitude of the positive and negative side modulation waves ap* and an*.

Figure 9:
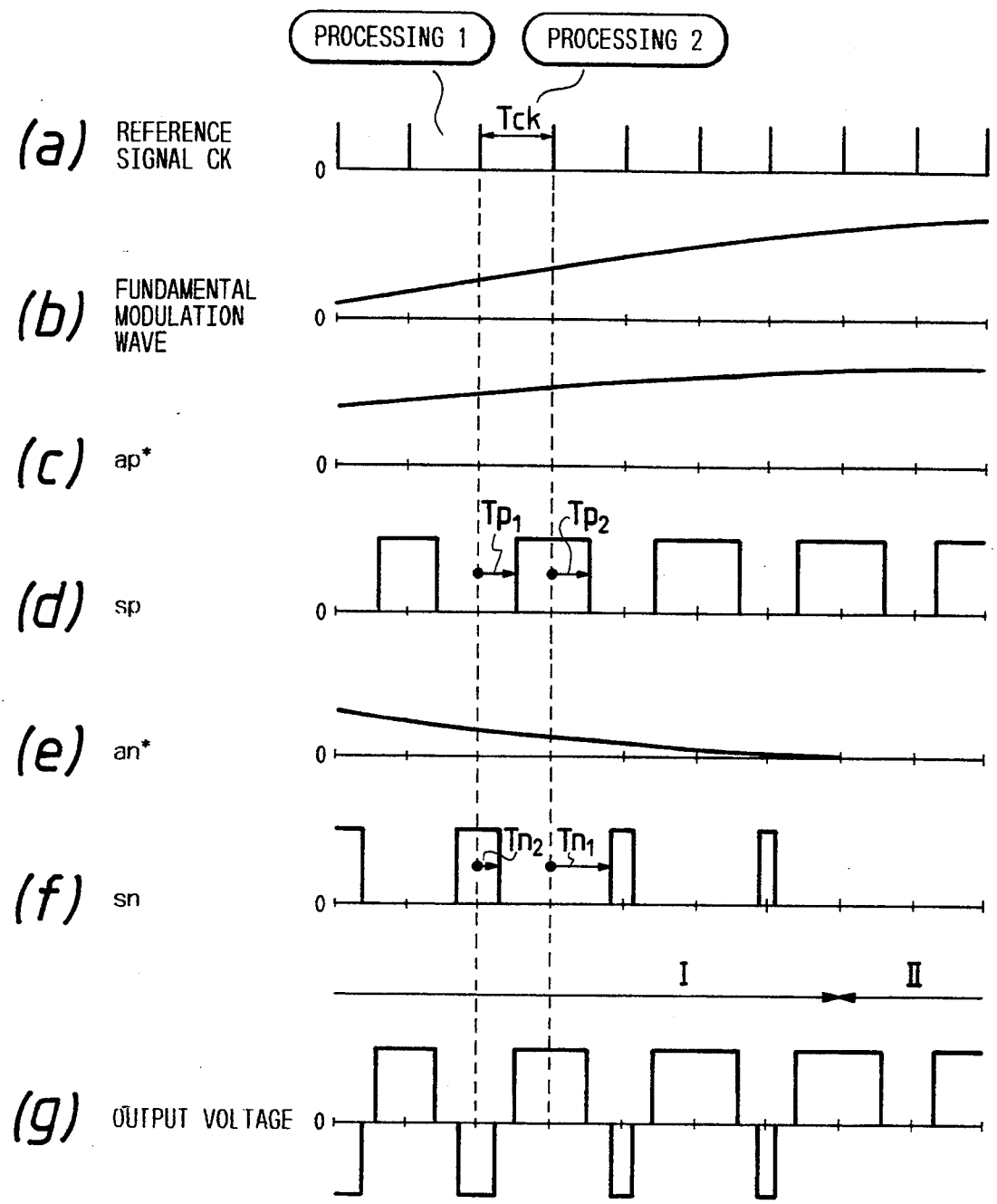
FIGS. 9a-g are diagrams for explaining pulse pattern generation during dipolar modulation operation and during unipolar modulation operation.

FIG. 9 illustrates an example of pulse pattern generation in the dipolar modulation in period I and of pulse pattern generation in the unipolar modulation in period II.

Figure 10:
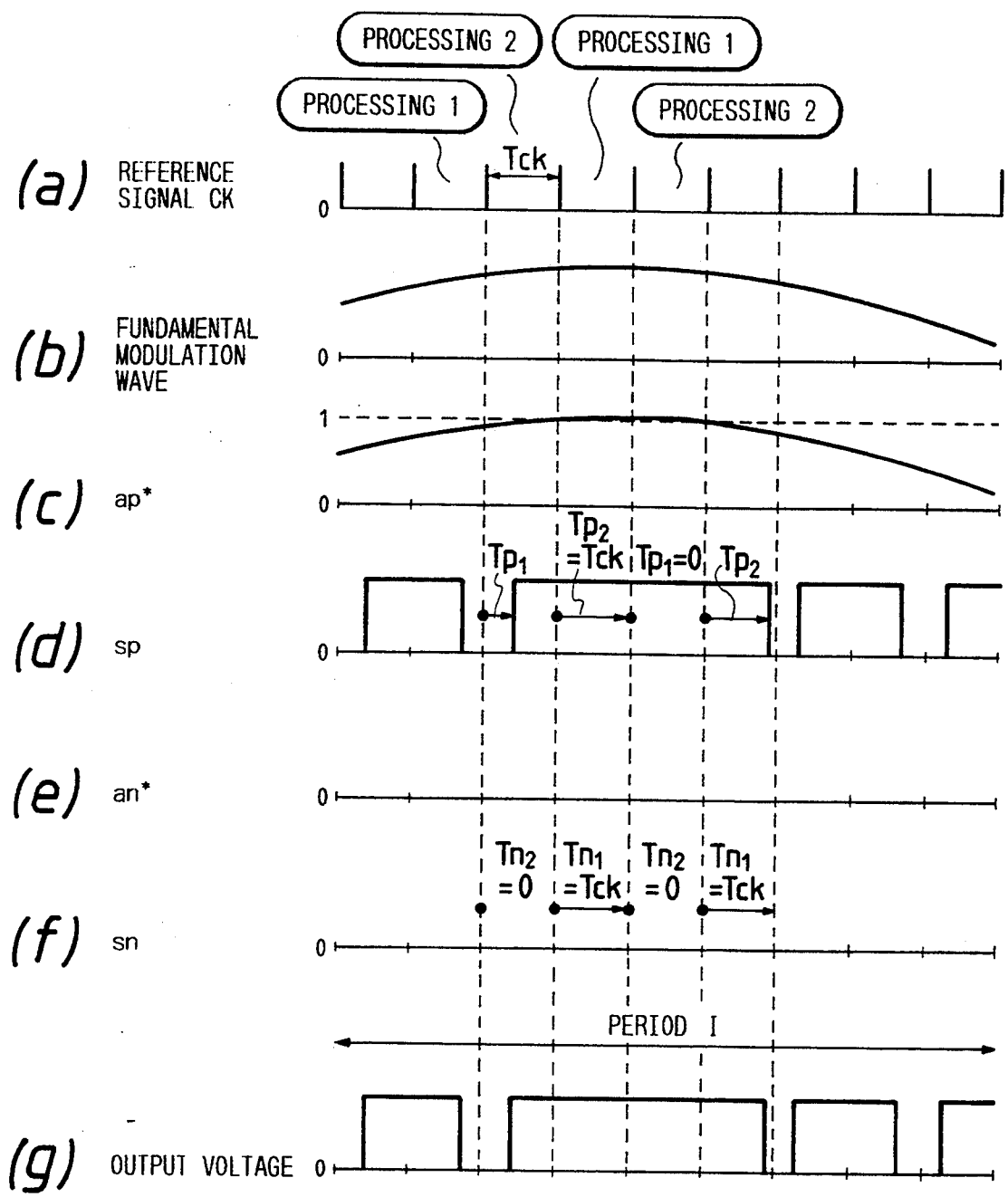
FIGS. 10a-g are diagrams for explaining pulse pattern generation during overmodulation operation.
Figure 11:
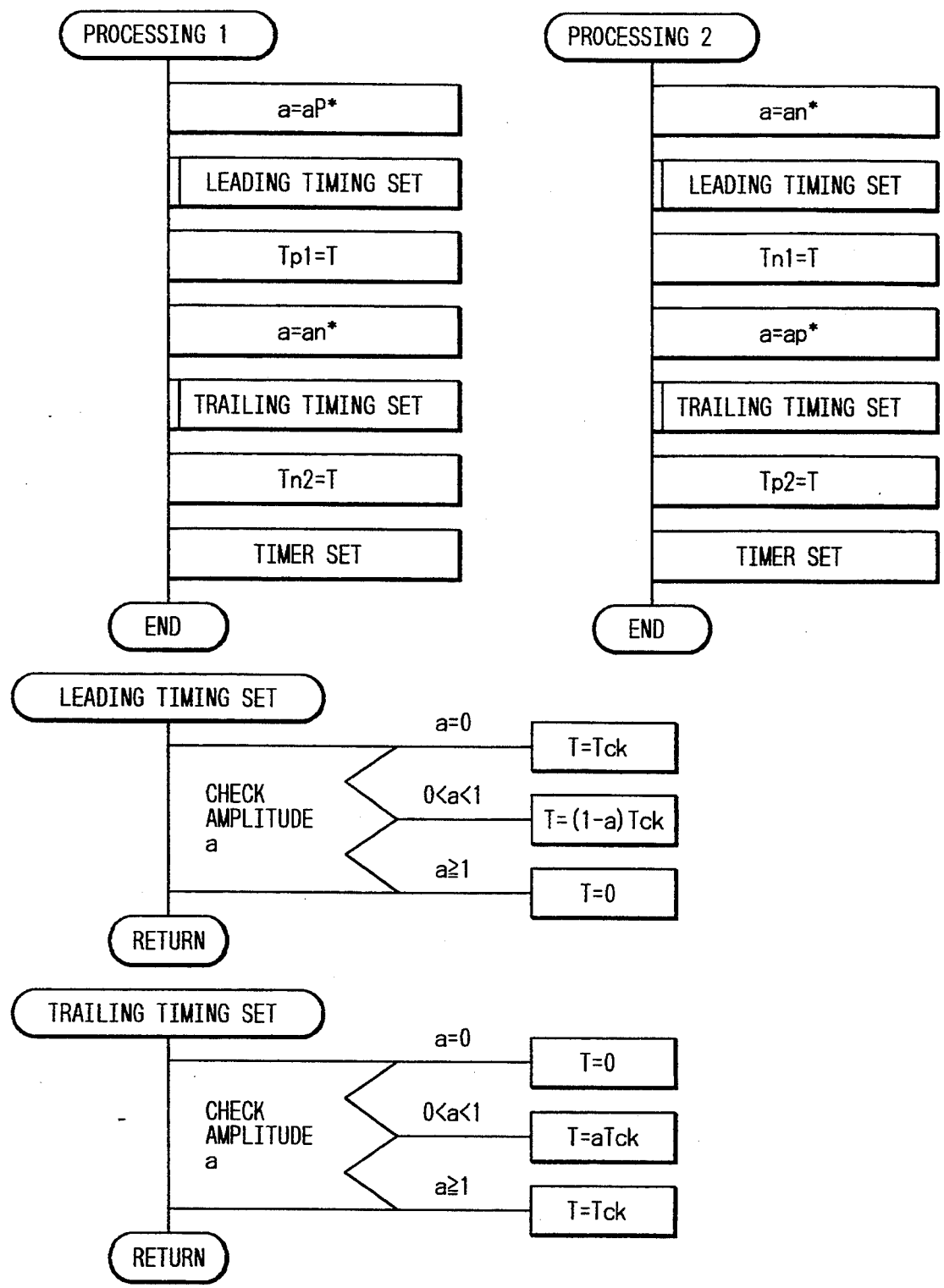
FIG. 11 is a flowchart illustrating processes performed in the pulse pattern generator 31 shown in FIG. 1.

FIG. 10 illustrates an example of pulse pattern generation wherein the absolute value of the positive or negative side modulation wave ap* or an* exceeds over 1 under the unipolar modulation (hereinbelow, called as overmodulation). FIG. 11 shows processing flowcharts performed in the pulse generator 31 for generating the pulse patterns illustrated in FIG. 9 and FIG. 10.

During the dipolar modulation in FIGS. 9, the leading timing Tp1 of the positive side pulse pattern Sp and the trailing timing Tn2 of the negative side pulse pattern Sn are determined based upon the following formulas depending upon the positive and negative side modulation waves ap* and an*.

$$Tp1 = (1-ap^*)\, Tck \qquad (12)$$

$$Tn2 = an^* \, Tck \qquad (13)$$

Wherein, Tck is period of the reference signal CK.

Then, the above values are set in the timer (process 1).

The timer is operating in synchronism with the reference signals CK and outputs pulses of positive and negative side pulse trains Sp and Sn at the timings illustrated in FIG. 9.

In the following period, the trailing timing Tp2 of the positive side pulse pattern Sp and the leading timing Tn1 of the negative side pulse pattern Sn are obtained according to the following formulas and set in the timer (process 2).

$$Tp2 = ap^* \, Tck \qquad (14)$$

$$Tn1 = (1-an^*)\, Tck \qquad (15)$$

Likely, the dipolar modulation is realized by alternatively performing the processes 1 and 2 in synchronism with the reference signals CK.

During the unipolar modulation, generation of only unipolar pulses is required as illustrated in period II in FIG. 9, and the unipolar modulation is realized by suppressing pulse generation in period II wherein the amplitude of the negative side modulation wave an* is zero.

Further, when the amplitudes of the positive and negative side modulation waves ap* and an* increase and the absolute values thereof exceed over, the modulation mode shifts to the overmodulation mode as illustrated in FIG. 10.

When the amplitude of the positive or negative side modulation wave ap* or an* exceeds over, the pulse leading timing is reduced to zero and the pulse trailing timing is set at Tck.

In such instance, pulse generation continues until the amplitude of the positive or negative side modulation waves ap* or an* reduces below one.

When the amplitude is further raised, the modulation mode shifts finally to the three level single pulse modulation mode.

In this mode, Tp1, Tp2, Tn1 and Tn2 are set so as to maintain a zero potential period of more than a predetermined value and a maximum output voltage of the three level inverter is outputted.

Figure 12:
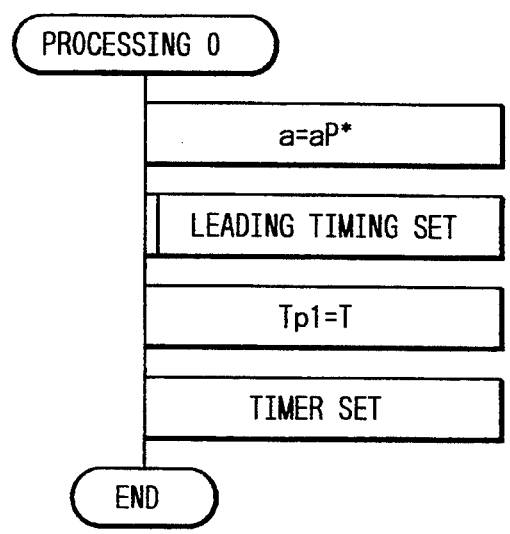
FIG. 12 is a flowchart illustrating another process performed in the pattern generator 31 shown in FIG. 1.

Further, since the setting of pulse trailing timing is unnecessitated during starting, process 0 illustrated in FIG. 12 is performed.

It is effective to produce the output voltage pulses by making use of the reference signals CK having an equal interval, however reference signals CK having unequal intervals are also applicable within a range that the zero voltage is maintained in the pulse generator 31.

Further, when the switching frequency of the switching elements constituting the inverter main circuit is set low in the region where the inverter output frequency is low and the dipolar modulation is performed, and the switching frequency is set to increase high in accordance with the transition to the unipolar modulation, switching loss in the switching elements is kept substantially constant over the entire inverter operation regions.

Namely, dependent upon the decrease of the offset amount B in the partial dipolar modulation region the frequency of the clock signals CK is adapted to be increased. Thereby, the switching loss can be kept constant without modifying the other constitutions.

When a microprocessor is applied to the control device of the present invention, a part of or all of the above pulse generating means can be, of course, realized by programed softwear.

Further, in the above embodiment, the offset amount B is varied based upon the fundamental modulation wave amplitude A, however when there is a predetermined relationship, such as proportional relationship, between the fundamental modulation wave amplitude A and the inverter output frequency command, the offset value can be varied in response to the inverter output frequency command or the vehicle speed.

In the present embodiment, the output voltage can be adjusted continuously and smoothly from zero voltage to the maximum voltage and further, a highly accurate and stable output voltage can be supplied.

Further, in the dipolar modulation region illustrated in FIG. 3 the positive and negative side modulation waves are away from the zero level by a predetermined value, the minimum on time is obtained without fail when PWM pulses are produced.

However, in the modulation modes as illustrated in FIG. 4 and FIG. 5, output voltages corresponding near to zero have to be reproduced by making use of the positive and negative side modulation waves so that such a period, wherein the minimum on time can not be obtained, occurs.

For ascertaining the minimum on time, a measure is contemplated wherein the pulse width is always monitored and when a pulse having a width below the minimum on time is apt to be generated the pulse is thinned out.

However, with the above measure, the pulse which is generated in order to reproduce an output voltage corresponding correctly to an output voltage command is mechanically removed, thereby harmonic contents increase to increase current ripples.

For resolving the above problems, in another embodiment of the present invention, the amplitude command distributor 2 is modified so as to ascertain the minimum on time while taking advantage of the features of the three level inverter.

Figure 13:
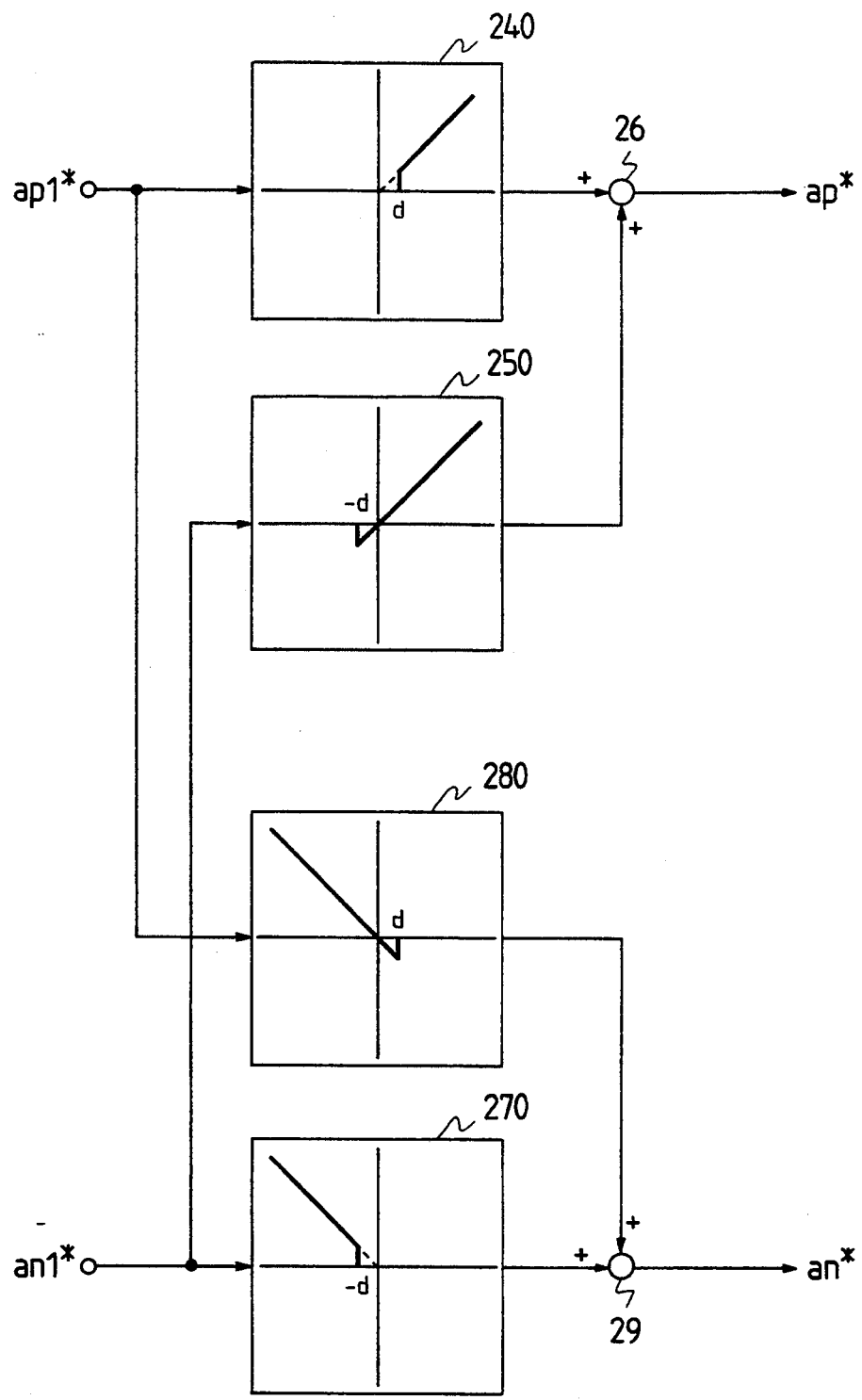
FIG. 13 is a diagram illustrating another embodiment of polarity discrimination and distributors according to the present invention.

Namely, the polarity discrimination and distributors 24, 25, 27 and 28 as shown in FIG. 1 are improved as illustrated in FIG. 13 so as to acertain the minimum on time.

Hereinbelow the modified amplitude command distributor is explained with reference to FIG. 13 and FIG. 14.

The polarity discrimination and distributors 240, 250, 270 and 280 are constituted in such a manner that in order to ascertain the positive side minimum on time the polarity discrimination and distributor 240 is biased so as not to output an output voltage command below a predetermined value d which corresponds to the minimum on time and the corresponding portion is compensated by the negative side output voltage command.

Figure 14:
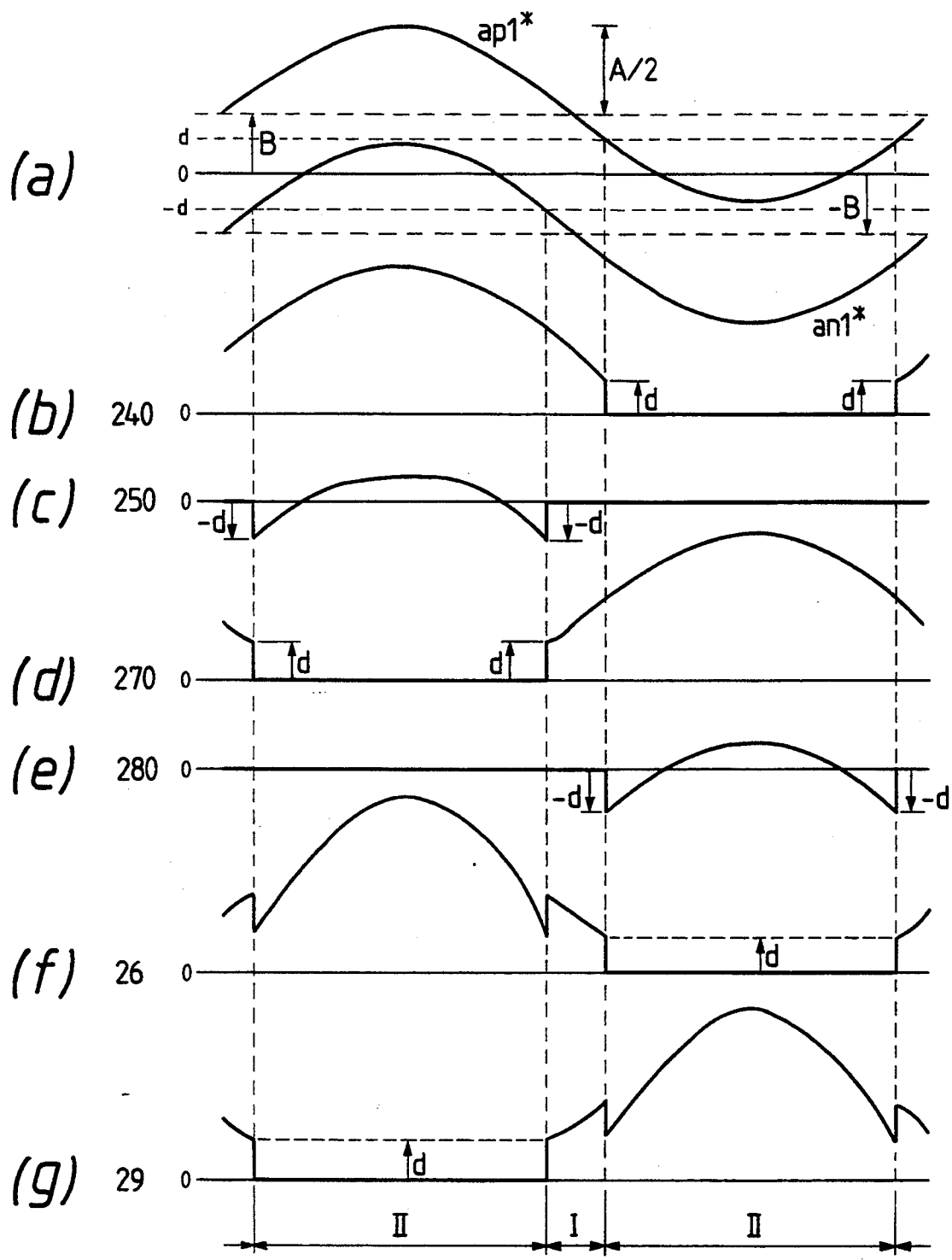
FIGS. 14a-g are diagrams illustrating waveforms at respective portions in the other embodiment shown in FIG. 13.

The biased modulation waves ap1* and an1* as illustrated in FIG. 14 (a) are respectively inputted to the polarity discrimination and distributors 240, 250, 270 and 280 of which respective output wave forms are illustrated FIG. 14 (b)~(e), and the outputs, in that positive and negative side modulation waves ap* and an* from the adders 26 and 29 are those illustrated in FIG. 14 (f) and (g).

Accordingly, no output voltage commands below the minimum on time are outputted both from the positive and negative side modulation waves. Moreover, these outputs are obtained by processing the output voltage commands, the ripple increase in the inverter output current is eliminated.

Further, the advantages of the present embodiments were explained with reference to one phase, however, the same advantages are likely obtained in two phases or multi-phases more than two.

Still further, the present embodiments were explained with reference to an induction motor, however, the present invention is also applicable to a synchronous motor with the same advantages.

In the above, all of the embodiments are explained in connection with an inverter, however the present invention is also applicable to a self exciting converter converting an AC to a DC which is constituted by connecting the output terminals of the inverter explained in the embodiments to an AC power source via reactance elements to perform a regenerating operation with the same advantages in case of the inverter operation.

According to the present invention, the inverter output voltage can be adjusted continuously and smoothly from zero voltage to the maximum voltage.

Further, a very small output voltage corresponding to the output voltage command can be reproduced as the output voltage of the inverter.

Having disclosed our invention and a preferred embodiment thereof, several alternative embodiments of our invention will be apparent to a person skilled in the art. This disclosure is intended to cover my best mode, which is disclosed, and is intended to cover all modifications that are in the spirit of my invention that we now claim.

1. An electrical power converter arrangement comprising:
   a converter having positive side semiconductor switching elements connected in series and negative side semiconductor switching elements connected in series, said converter converting a DC voltage to an AC output phase voltage having at least three potential levels; and
   a control unit for controlling turn on and turn off of the positive side and negative side semiconductor switching elements of said converter to operate said converter dependent upon a voltage amplitude command input to said control unit for a fundamental wave in a first modulation mode in which the AC output phase voltage in a half cycle thereof is realized by alternating positive and negative output pulses and in a second modulation mode in which the AC output phase voltage in a half cycle thereof is realized by output pulses having only the same polarity as the corresponding fundamental modulation wave,
   wherein transition between the first modulation mode operation and the second modulation mode operation is performed via a third modulation mode in which the AC output phase voltage in a first period in a half cycle thereof is realized by alternating positive and negative output pulses and the AC output phase voltage in a second period in the half cycle thereof is realized by output pulses having only the same polarity as the corresponding fundamental modulation wave and the intervals of the first and second periods in the half cycle of the AC output phase voltage varies dependent upon the voltage amplitude command for the fundamental modulation wave.

2. An electrical power converter arrangement according to claim 1, wherein said control unit comprises:
   first means for preparing the fundamental modulation wave based upon the voltage amplitude command and a frequency command to be output from an inverter;
   second means for preparing a positive biased modulation wave and a negative biased modulation wave dependent upon the voltage amplitude command;
   third means for preparing a positive side modulation wave and a negative side modulation wave dependent upon both the positive and negative biased modulation waves; and
   fourth means for generating pulse width modulation pulse trains for the positive side and negative side semiconductor switching elements based upon the positive and negative side modulation waves.

3. An electrical power converter arrangement according to claim 2, wherein said third means produces the positive side modulation wave by adding a positive component of the negative biased modulation wave to the positive component of the positive biased modulation wave (ap1*) and produces the negative side modulation wave by adding a negative component of the positive biased modulation wave to the negative component of the negative biased modulation wave.

4. An electrical power converter arrangement according to claim 2, wherein said third means suppresses outputting of the positive and negative side modulation wave below predetermined positive and negative values which produce a pulse having a width corresponding to the minimum "on" time of the positive side and negative side semiconductor switching elements, and produces the positive side modulation wave by adding a component of the negative biased modulation wave above the predetermined negative value to the unsuppressed component of the positive biased modulation wave and the negative side modulation wave by adding a component of the positive biased modulation wave below the predetermined positive value to the unsuppressed component of the negative biased modulation wave.

5. An electrical power converter arrangement according to claim 2, wherein said fourth means are applied to reference clock signals CK for determining timing of the pulse generation therefrom, and the frequency of the reference clock signals CK is adapted to increase in accordance with the increase of the voltage amplitude command for the fundamental modulation wave.

6. An electrical power converter arrangement according to claim 1, wherein:
   said control unit comprises:
   first means for preparing the fundamental modulation wave based upon the voltage amplitude command and frequency command to be outputted from an inverter;
   second means for preparing a positive biased modulation wave and a negative biased modulation wave dependent upon the voltage amplitude command;
   third means for preparing a positive side modulation wave dependent upon the both positive and negative biased modulation waves and a negative side modulation wave dependent upon the both positive and negative biased modulation waves; and
   fourth means for generating pulse width modulation pulse trains for the semiconductor switching elements based upon the positive and negative side modulation waves.

7. An electrical power converter arrangement according to claim 2, wherein said third means produces the positive side modulation wave by adding a positive component of the negative biased modulation wave to the positive component of the positive biased modulation wave and the negative side modulation wave by adding negative component of the positive biased modulation wave to the negative component of the negative biased modulation wave.

8. An electrical power converter arrangement according to claim 2, wherein said third means suppresses outputting of the positive and negative side modulation wave below predetermined positive and negative values which produce a pulse having a width corresponding to the minimum on time of the semiconductor switching elements, and produces the positive side modulation wave by adding a component of the negative biased modulation wave above the predetermined negative value to the unsuppressed component of the positive biased modulation wave and the negative side modulation wave by adding a component of the positive biased modulation wave below the predetermined positive value to the unsuppressed component of the negative biased modulation wave.

9. An electrical power converter arrangement according to claim 2, wherein said fourth means are applied of reference clock signals for determining timing of the pulse generation therefrom and the frequency of the reference clock signals is adapted to increase in accordance with the increase of the voltage amplitude command for the fundamental modulation wave.

10. An electrical power converter comprising:
   a converter having positive side semiconductor switching elements connected in series and negative side semiconductor switching elements connected in series, which converts a DC voltage to an AC output phase voltage having at least three potential levels;
   a control unit for said converter which turns said semiconductor switching elements on and off to operate said converter;
   wherein said converter operates dependent upon a voltage amplitude command inputted to said control unit for a fundamental modulation wave in a plurality of modulation modes; and
   wherein said plurality of modulation modes comprise a first modulation mode in which the AC output phase voltage in a half cycle thereof is realized by alternating positive and negative output pulses, a second modulation mode in which the AC output phase voltage in a half cycle thereof is realized by output pulses having only the same polarity as the corresponding fundamental modulation wave, wherein transition between said first modulation mode and said second modulation mode operation is performed via a third modulation mode in which the AC output phase voltage in a first period in a half cycle thereof is realized by alternating positive and negative output pulses and the AC output phase voltage in a second period in the half cycle thereof is realized by output pulses having only the same polarity as the corresponding fundamental modulation wave and the intervals of the first and second periods in the half cycle of the AC output phase voltage varies dependent upon the voltage amplitude command for the fundamental modulation wave.

* * * * *